(12) United States Patent
Liu et al.

(10) Patent No.: US 9,075,832 B2
(45) Date of Patent: Jul. 7, 2015

(54) TENANT PLACEMENT IN MULTITENANT DATABASES FOR PROFIT MAXIMIZATION

(71) Applicants: Ziyang Liu, Cupertino, CA (US); Vahit Hakan Hacigumus, San Jose, CA (US)

(72) Inventors: Ziyang Liu, Cupertino, CA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 204 days.

(21) Appl. No.: 13/858,476

(22) Filed: Apr. 8, 2013

(65) Prior Publication Data

US 2013/0346360 A1 Dec. 26, 2013

Related U.S. Application Data

(60) Provisional application No. 61/664,253, filed on Jun. 26, 2012.

(51) Int. Cl.
*G06Q 10/00* (2012.01)
*G06F 17/30* (2006.01)
*G06Q 10/06* (2012.01)

(52) U.S. Cl.
CPC ...... *G06F 17/30289* (2013.01); *G06Q 10/0639* (2013.01)

(58) Field of Classification Search
None
See application file for complete search history.

(56) References Cited

U.S. PATENT DOCUMENTS

| | | | |
|---|---|---|---|
| 8,380,557 B2* | 2/2013 | Moon et al. | 705/7.28 |
| 2010/0077449 A1* | 3/2010 | Kwok et al. | 726/3 |
| 2012/0066020 A1* | 3/2012 | Moon et al. | 705/7.28 |
| 2012/0265741 A1* | 10/2012 | Moon et al. | 707/694 |

* cited by examiner

*Primary Examiner* — Hung Le
(74) *Attorney, Agent, or Firm* — Joseph Kolodka

(57) ABSTRACT

A method for database consolidation includes generating a model for expected penalty estimation; determining a tenant's value as a function of query arrival rate and SLA penalty; placing a tenant to minimize a total expected cost in the order of the tenant value; and progressively using additional servers to prevent any server from being saturated to guarantee a tenant placement that costs no more than four times the cost of any other placement.

10 Claims, 4 Drawing Sheets

TENANT PLACEMENT IN MULTITENANT DATABASES FOR PROFIT MAXIMIZATION

The present application is a non-provisional application of and claims priority to Provisional Application Ser. No. 61/377,605 filed Aug. 27, 2010 and 61/664,253 filed Jun. 26, 2012, the content of which is incorporated by reference.

BACKGROUND

The present invention relates to Tenant Placement in Multitenant Databases for Profit Maximization.

With the increasing popularity of cloud computing, the benefits of hosting applications on a cloud service provider (including IaaS, PaaS and SaaS) becomes more and more apparent and widely accepted. It not only avoids high capital expenditure, but also minimizes the risk of under-provisioning and over-provisioning using an elastic, pay-as-you-go type approach. From the cloud service provider's perspective, to achieve economies of scale, an important practice is to use each physical server to host multiple tenants (a.k.a. multitenancy). One approach is to use virtual machines with fixed resources such as Amazon EC2 instances. It provides good isolations among different tenants, but the downside is the compromise of resource sharing. Another possibility is that all tenants use the same resource pool, so that occasional workload bursts from a few tenants can be gracefully handled. Such a model is often used in Software as a Service platforms where tenants run Web-based services that are accessed by Web users. Usually the revenue of a cloud service provider is generated by meeting the service level agreements (SLA) the provider negotiates with each tenant, in terms of various criteria such as response time, availability, throughput, among others. For example, a service level agreement may be that if the response time of the query is less than 5 seconds, the tenant pays the provider for the service, otherwise the provider pays the tenant a penalty. Since maximizing the profit is the ultimate goal of a cloud service provider, it should be the main optimization criterion of decision-making in multi-tenant databases.

There has been a great interest in exploiting the cloud as a platform for database as a service. As with other cloud-based services, database services may enjoy cost efficiency through consolidation: hosting multiple databases within a single physical server. Aggressive consolidation, however, may hurt the service quality, leading to SLA violation penalty, which in turn reduces the total business profit, or SLA profit.

Cloud service providers have conflicting goals when distributing the tenants on computing servers. On the one hand, purchasing, renting or using each server incurs an expense, and thus the provider is motivated to use as few servers as possible. On the other hand, if a server hosts too many tenants and is too crowded, it may lead to a high chance of violating the service level agreements, which incurs penalties. Thus the tenant placement should be carefully planned in order to minimize the total cost.

One may naturally think of the connection between tenant placement and bin packing, a classic NP-hard problem. It is worthwhile to point out that tenant placement has several additional complications compared with bin packing First, in bin packing (as well as its variations studied so far, to the knowledge), each item has a fixed size, whereas each cloud tenant's size may vary with time (e.g., a tenant may have more users on weekdays than on weekends). Second, in bin packing, a hard constraint is that the total size of all items in a bin cannot exceed the bin's capacity. In tenant placement there is no such constraint, but the more tenants a server hosts, the more SLA violations may occur. Lastly, the optimization goal of bin packing is minimizing the total number of bins, whereas in tenant placement the goal is to minimize the total cost, which includes the cost of the servers and the penalty of SLA violations.

In cloud computing, there is an opportunity for workload consolidation for better resource utilization. We consider the case of database consolidation, which is often called multitenant databases. While consolidation helps to reduce operational cost, too aggressive consolidation may increase SLA violation penalty due to the crowded environment, which leads to the reduced total profit. Hence the problem is: given a set of tenants, their workload information (query arrival rate, query execution time), their service level agreement (SLA) functions and the cost of operating a server, how many servers should we use and how to assign tenants to the servers so that the total cost (server cost plus SLA penalty cost) is minimized.

Conventional systems are not profit-driven and do not aim at minimizing SLA violation penalties. Their optimization goal is usually minimizing the number of servers subject to certain constraints (such as no server may be overload, or a certain throughput needs to be achieved), and they usually make restrictive assumptions such as the load of each tenant is fixed, there are a certain number of types of tenants, among others.

SUMMARY

In one aspect, a method for database consolidation includes generating a model for expected penalty estimation; determining a tenant's value as a function of query arrival rate and SLA penalty; placing a tenant to minimize a total expected cost in the order of the tenant value; and progressively using additional servers to prevent any server from being saturated to guarantee a tenant placement that costs no more than four times the cost of any other placement In another aspect, a system includes a model for expected penalty estimation, and a method for tenant placement to minimize the total expected cost. The method places the tenants in the order of their values, which is a function of query arrival rate and SLA penalty. By placing the tenants in this order, as well as progressively using additional servers to prevent any server from being too saturated, this method guarantees to output a tenant placement that costs no more than four times of the cost of any other placement techniques.

Advantages of the preferred embodiments may include one or more of the following. The system provides a high quality tenant placement method in the sense and reduces the cost of the service provider compared to the existing baseline methods. The system performs the placement in a highly efficient way. In one embodiment, the method uses no more than 0.2 second for several hundred tenants, and is thus a good tradeoff between effectiveness and efficiency. The method can perform SLA profit-aware tenant placement considers the optimization of profit, while other systems that optimize lower level systems metrics automatically do always result in optimizing the profit. The system considers SLA profit maximization in VM consolidation. The system supports flexible scheduling policies. The system controls the placement of stateful tenants, since future query dispatching and scheduling depend on the placement. The system provides MTDB management techniques that are orthogonal to the DB sharing schemes, i.e. tenant placement and capacity planning problem, allowing DSPs' to freely choose the best sharing scheme for their tenants, considering scalability and isolation requirements. The MTDB system can maximize business profit. The system serves small tenants using the cloud resources: servers are rented from IaaS (Infrastructure-as-a-Service) providers, such as Amazon EC2, to provide database-as-a-service to the public. The system focuses on maximizing SLA profit, which is equal to SLA revenue that service providers make from the clients, minus the operational cost, such as the server operation cost. The system can efficiently manage many tenants with different types of workloads (i.e. query types and query arrival patterns) and different types of SLAs. The system maximizes profit by: i) given N servers, how to consolidate databases such that the SLA penalty is minimized and hence the total profit is maximized (i.e. tenant placement problem), and ii) how many servers should be used to maximize the total profit (i.e. capacity planning problem) in an MTDB environment.

DESCRIPTION

Figure 1:
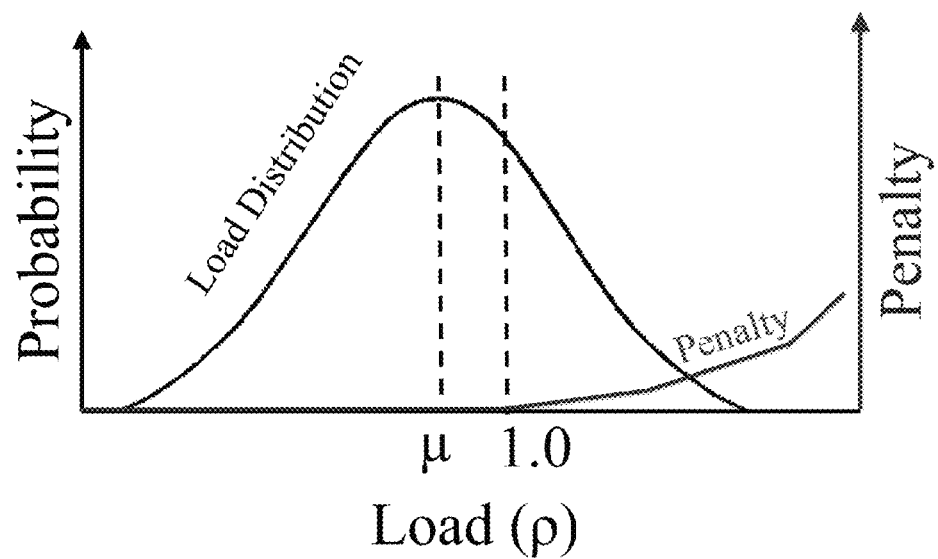
FIG. 1 shows an exemplary multi-tenants' aggregated load distribution for a server and a penalty function.

FIG. 1 shows an exemplary multi-tenants' aggregated load distribution for a server and a penalty function. For a given server with one or more tenants, the system models the aggregated load distribution as shown in FIG. 1, where the mean ($\mu$) is the sum of load means of all tenants, and the variance ($\sigma^2$) is the sum of load variances of all tenants. The system also models the SLA penalty of a server to be the violation of all queries' SLAs with overload (load>1.0) and zero with underload (load<1.0). By integrating these probabilities and the penalty function, the system can determine an expected penalty value of this server. Based on this expected penalty computation, the system performs the tenant placement in flowchart of FIG. 2.

Figure 2:
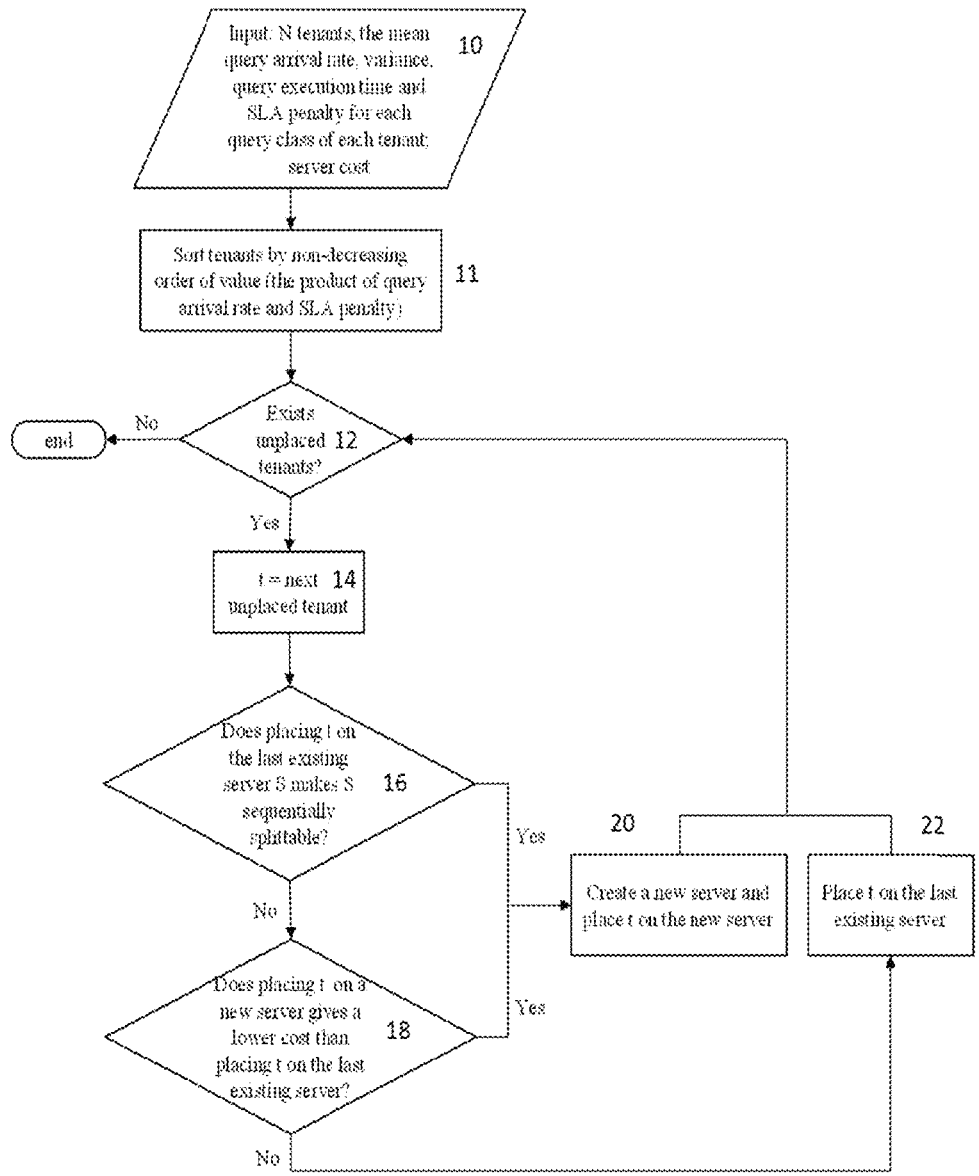
FIG. 2 shows an exemplary process to perform aggregated load distribution with the penalty.

FIG. 2 shows an exemplary process to perform aggregated load distribution with the penalty. The system receives as inputs the tenants, the mean query arrival rate, variance, query execution time, and SLA penalty of reach query class of each tenant, and the server cost (10). Next, the process sorts tenants by decreasing value (11). The process then checks if unplaced tenants exist (12) and if not, the process exits. Otherwise the process sets t to the next unplaced tenant (14). The process then checks if placing t on the last existing server S makes S sequentially splittable (16). If not, the process further checks if placing t on a new server gives a lower cost than placing t on the last existing server (18). From 16 or 18, the process creates a new server and places t on the new server (20). From 18, if the cost is higher, the process places t on the last existing server (22). From 20 or 22, the process loops back to 12 to process the next unplaced tenant.

Two approximation algorithms can be used, one for the case of uniform query processing time and SLA penalty (i.e., all tenants' queries have the same processing time, and all SLA penalties are the same), and the other for the general case. The first algorithm is proved to have an approximation ratio of 3, and the second is proved to have an approximation ratio of 4. The second approximation algorithm can be used with a dynamic programming procedure, which further improves the quality and reduces the cost. The system provides a solution to the tenant placement problem to maximize the provider's profit by minimizing the total cost, which includes the cost of the servers and the penalty of SLA violations. The solution allows the tenants' resource usage to vary with time and be described using probabilistic distributions, and do not rely on historical data.

SLAs in general may be defined in terms of various criteria, such as service latency, throughput, consistency, security, etc. In this paper, we focus on service latency, or response time. Even with response time alone, there can be multiple specification methods: i) based on the average query response time, ii) based on the tail distribution of query response times (or quantile-based), or iii) based on individual query response times. We choose the last one, which has the finest granularity and most accurately captures the performance of the provider. Also, if this is preferred, there exist techniques (e.g., [13]) that directly map quantile-based SLAs to per-query SLAs.

In the system, we use one-step SLA functions. The service provider gets a revenue if a query is processed before a certain deadline; otherwise the service provider pays a penalty. We adopt a similar setting as [7, 25, 26], where each tenant has one or more query classes; each query class is associated with an SLA and one or more queries associated. Given an SLA revenue function, we maximize the profit:

$$\text{Profit} = \sum_i r_i - OpCost$$

where $r_i$ is the revenue generated by a query i, while OpCost is the operational cost.

Lastly, given the SLA revenue function, R(x), defined as above, we derive SLA penalty cost function, C(x), as:

$$C(x) = R_0 - R(x)$$

where $R_0$ is the revenue if the SLA is met. An example is shown in FIG. 1(b). Note that profit maximization based on R(x), which is the objective, is equivalent to minimizing SLA penalty cost based on C(x). In this paper, we focus on SLA penalty cost minimization using C(x).

The load of a tenant t is calculated by load(t)=avgProc(t)/avgIntv(t), where avgIntv(t) is the average interval length between two queries of tenant t, which is the inverse of query arrival rate, and avgProc(t) is the average query processing time of t. The load of a server in a period of time is the number of queries received divided by the number of queries the server is able to process. Equivalently, the load of a server is the average query processing time of the server divided by the average interval length between two query arrivals. Thus server load>100% means that queries arrive at the server faster than the speed the server can process them, indicating an overload situation, and vice versa.

For simplicity, "tenant size" refer to the average expected load of a tenant (analogous to item size in the bin packing problem). Over any period of time, the load of a server is a superlinear combination of the loads of all tenants on the server. Specifically, the load of a server is the sum of the load of all tenants on the server, multiplied by a factor which increases with the total load of tenants. This is because in practice, it has been shown that the CPU and memory usage of a server by multiple tenants combine linearly, while the combined I/O usage is generally higher than the sum of I/O usage of all tenants and that the I/O usage of a server only depends on the total working set size and update rate of the tenants, but does not depend on which tenants are on the server.

We model the query arrival of each tenant as a non-homogeneous Poisson process (i.e., the arrival rate may vary with time). Poisson process is widely used to model the arrival of items, e.g., the arrival of customers in a queue, the arrival of telephone calls, etc. It is also commonly adopted to model the arrival of queries in a system. Further, since an application may have different numbers of users at different time of day, day of week, etc., we use normal distribution to model the variation of arrival rate. The number of real workloads and server usage (such as the number of requests and CPU usage) of Flickr servers exhibit normal distribution patterns. Since a tenant with a high query frequency usually observes a high variance, we assume that the variance of the normal distribution is proportional to its mean.

An SLA penalty model is necessary to estimate how often a tenant's query misses the SLA deadline, given the set of tenants on a server. This estimation is then used to guide the placement strategy. Nevertheless, the SLA penalty model is usually orthogonal to the placement algorithms. Next we introduce the SLA penalty model we adopt, but it is not a main focus of the paper, and other SLA penalty models may be used.

Intuitively, the server penalty should increase superlinearly with the load (i.e., the penalty should increase faster than the load). For example, when the server load increases from 80% to 90%, the SLA penalty increase should be more than when we increase the load from 70% to 80%. Because at 90% load, the server is on the brink of overload, and is much more prone to becoming overload due to tenant workload spikes, compared with 80% load. In this paper we adopt the following SLA penalty model as shown in FIG. 2: queries arrived during server overload (i.e., load>100%) will miss their SLA deadlines and the service provider needs to pay the penalty; and other queries will meet their SLA. This is because the load of a tenant will unlikely change very frequently (e.g., it may remain near a constant during morning rush hour, and near another constant during the night, etc.), and SLA penalties occur mainly because of prolonged system overload (e.g. more than 1 min or so), rather than a temporary burst in query arrival for a short period (e.g. a little bit dense arrival during 10 millisecond). If a system is overload for a long time (compared with the query execution time/SLA deadline), then the delay of processing the queries becomes longer and longer, and the vast majority of the queries arrived during this time should miss the deadline. On the other hand, if the system is underloaded for a long time, then the vast majority of the queries should finish before the deadline (of course, the deadline should be reasonably longer than the query processing time).

One implementation makes no restrictions in the following aspects: (1) tenant sizes: different tenants may have arbitrarily different query frequencies; (2) Query processing times: queries of different tenants may have arbitrarily different average processing times; (3) SLA penalties: the SLA penalties for different query classes can be arbitrarily different; (4) Query scheduling algorithm: although we adopt the first come first served method due to simplicity of discussion and implementation, other scheduling algorithms such as cost based scheduling [7] can also be applied, as long as there is a way to calculate the expected SLA penalty given the information of tenants on a server.

One embodiment uses an adaptation of the bin packing algorithm for tenant placement. For bin packing, a simple yet effective heuristics (Best Fit) is to place each item in the bin that can fit the item and has the smallest remaining space, or create a new bin if no existing bin can fit the item. For any bin packing instance, Best Fit uses at most twice the number of bins as any other solution. We can easily use such a strategy for TP-Uniform and TP-General, with a small modification that we optimize for the cost, rather than trying to pack each server as full as possible. Specifically, for each tenant, Best Fit would place it on a server that is as full as possible but still has room for this tenant. Since the goal is to minimize the cost, the greedy algorithm places it on one of the existing servers, or create a new server for this tenant, whichever choice minimizes the current expected cost.

Although the Best Fit algorithm for the bin packing problem has a constant approximation ratio, we will show that the performance of such a strategy for either TP-Uniform or TP-General can be arbitrarily worse than the optimal solution.

Thus, suppose the sizes of all tenants are sufficiently small, such that even when the load of a server is close to 1, adding one more tenant is still cheaper than placing this tenant on a new server. The greedy algorithm tends to pack lots of tenants on a server when the tenants are small. Therefore, the idea of improvement is to proactively create new servers, even if it increases the current expected cost. To achieve this, we introduce the concept of half full servers. This is used to measure whether a server is too full and we should create new servers. A half full server is a server whose total tenant size is $S_H$, such that: if we have another tenant t of size $S_H$, it is equally costly to place t on this server, compared with placing t on a new server. If S(M) denotes the average total expected load of all tenants on server M, then with four servers $M_a$, $M_b$, $M_c$ and $M_d$, if $S(M_a)+S(M_b)=S(M_c)+S(M_d)$ and $|S(M_a)-S(M_b)|<S(M_c)-S(M_d)|$, then the expected cost of $M_a$ and $M_b$ is lower than that of $M_c$ and $M_d$. Given the cost of a server and the SLA penalty of a query, the value of $S_H$ can be computed via binary search in (0, 1).

---

Algorithm 1: Approximation Algorithm for TP-UNIFORM

Input : n tenants, the average query arrival rate of each
        tenant, query processing time r, SLA penalty L,
        server cost D
Find the value of $S_H$ via binary search in (0, 1)
T = {$t_1$, ..., $t_n$} = sorted tenants in decreasing order of size:
Create server $M_1$ for $t_1$
foreach $t_i \in$ T do
| j = arg $\min_j$ additional Penalty($t_i$, $M_j$) where $M_j$ is
| an existing server such that $S(M_j) + S(t_i) \leq 2S_H$ and
| additional Penalty($t_i$, $M_j$) $\leq$ Penalty($t_i$) + D
| if j exist then
| | Place $t_i$ on $M_j$
| else
| | Create a new server $M_k$
| | Place $t_i$ on $M_k$
| end
end

---

The approximation algorithm for TP-Uniform is shown above. additionalCost($t_i$,$M_j$) denotes the additional penalty of placing $t_i$ on $M_j$, and Penalty($t_i$) denotes the penalty of placing $t_i$ alone on a server. First, the process finds the value of $S_H$, and sort the tenants in decreasing order of size. Then, for each tenant $t_i$, it finds an existing server $M_j$ such that (1) placing $t_i$ on $M_j$ will not make the total tenant size on $M_j$ exceed $2S_H$; (2) placing $t_i$ on $M_j$ is cheaper compared with creating a new server for $t_i$; (3) placing $t_i$ on $M_j$ is the cheapest among all existing servers. If such a server $M_j$ exists, the process places $t_i$ on $M_j$. Otherwise, a new server is created for $t_i$. For any arbitrary instance of TP-Uniform, APP cannot be more than 3 times worse than OPT, i.e., cost(APP)$\leq$3·cost(OPT).

For TP-General, if we do not consider the difference of SLA penalty, the performance can be arbitrarily worse than the optimal solution. For example, with two types of tenants. Type 1: small size (e.g., s) and large SLA penalty (e.g., xP); Type 2: large size (e.g., ys) and small SLA penalty (e.g., P). It is possible that one Type 1 tenant can only be placed together with one Type 2 tenant, and one Type 2 tenant can only be placed together with one Type 1 tenant (otherwise the cost is so high that we should split them into multiple servers). Suppose there are n Type 1 tenants and n Type 2 tenants. If we do so, we need n servers. If in the input, each Type 1 tenant is followed by a Type 2 tenant and each Type 2 tenant is followed by a Type 1 tenant, then the greedy approach introduced in Section 5.1 will use n servers. For Algorithm 5.2, even though it sorts the tenants by size, the problem still remains: suppose we split each Type 2 tenant into multiple small-size tenants; each one has the same size as the Type 1 tenant. It is easy to see that Algorithm 1 will also need to use n servers.

However, it is possible that all Type 1 tenants can be placed in a single server and all Type 2 tenants can be placed in a single server. As long as the size of Type 1 tenants are sufficiently small (specifically, the total size of all Type 1 tenant is much smaller than the size of a single Type 2 tenant), and the SLA penalty of Type 2 tenants are sufficiently small (specifically, the SLA penalty of placing all Type 2 tenants together is much smaller than the SLA penalty of placing one Type 1 tenant and one Type 2 tenant together), the total SLA penalty of the second placement using 2 servers can be arbitrarily smaller than the total SLA penalty of the first placement using n servers. Besides, since n can be arbitrarily large, the server cost of the second placement can also be arbitrarily smaller than the server cost of the first placement. Therefore, processing the tenants either in arbitrary order or in the order of their sizes can lead to arbitrarily bad performance. Based on this observation, we must process the tenants in an order that considers their SLAs. We sort the tenants in the order of their normalized SLA penalty as defined below.

The normalized SLA penalty of a tenant t is the total expected SLA penalty of t's queries per time unit, if all these queries miss the SLA deadline. The normalized SLA penalty of t can be computed as $$NSP(t) = \sum_j (\mu_j \cdot L_j)$$

where $\mu_j$ and $L_j$ are the average arrival rate and SLA penalty of the j th query class of tenant t.

To solve the problem, we introduce the concept of sequential split is used. Whether tenants on a server can be sequentially split to make it more profitable can be determined by a binary search.

---
Algorithm 2: Approximation Algorithm for TP-GENERAL
---

Input : n tenants, the average query arrival rate, processing
time and SLA penalty of each tenant, server cost D
T = {t₁, . . . , tₙ} = sorted tenants in the order of $L_i \times \lambda_i$
(either increasing or decreasing)
Create server M₁ or t₁
foreach $t_i \in T$ do
    $M_j$ = the last created server
    if additional Penalty($t_i, M_j$) ≤ Penalty($t_i$) + D AND
    seqSplit($t_i, M_j$) = false then
       Place $t_i$ on $M_j$
    else
       Create a new server $M_k$
       Place $t_i$ on $M_k$ ---
Algorithm 2: Approximation Algorithm for TP-GENERAL
---
    end
end

Approximation Algorithm for TP-General

The algorithm for TP-General is shown above. It first sorts the tenants in the order of their normalized SLA penalty. We create a new server for the first tenant. For each subsequent tenant t, if the last created server M satisfies: (1) placing t on M is cheaper compared with creating a new server for t; (2) after placing t on M, the tenants on M cannot be sequentially split to make it more profitable, then t is placed on M. Otherwise, it creates a new server for t.

To prove the approximation ratio Algorithm 2, we introduce the following problem similar as TP-General: suppose each tenant can be arbitrarily split, and placed on different servers, except those tenants whose sizes are large enough, such that this tenant itself can be sequentially split to reduce the cost. Let OPT' denote the optimal solution for this problem, and OPT denote the optimal solution of the original problem. Apparently cost(OPT')≤cost(OPT). In the OPT' solution, no two servers $M_i$ and $M_j$ can have the following tenants: there is a tenant on $M_i$ whose normalized SLA penalty is higher than a tenant on $M_j$, but lower than another tenant on $M_j$. Moreover, for any arbitrary instance of TP-General, APP cannot be more than 4 times worse than OPT, i.e., cost(APP)≤4·cost(OPT).

Quality Improvement Using Dynamic Programming can be done. In the approximation algorithm, tenants placed on the servers have a fixed order, i.e., if two tenants $t_i$ and $t_j$ are placed on servers $M_x$ and $M_y$ respectively, and i<j, then x≤y. Since the order is fixed, we can use a dynamic programming approach to find the optimal solution wrt the fixed order and the number of servers.

The dynamic programming procedure is shown in Algorithm 3. Its input is the list of tenants sorted by their normalized SLA penalty and the number of servers used by the approximation algorithm (Algorithm 5.3), denoted by m.

Let C(i, j) be the expected SLA penalty when co-locating tenants $t_i$ through $t_j$ within a single server. We construct and fill in an n·m table, where n is the number of tenants and m is the number of servers. In each cell, we store two information, MP(i,j) and PrevCut(i,j). MP(i,j) is the minimum total expected penalty when placing the first i tenants on j servers. PrevCut(i,j) tells us where the previous cut is, for the setup that realizes the minimum total expected penalty. For example, PrevCut(100,10)=85 means that given one hundred ordered tenants and ten server, we need to put a cut after the tenant 85 (i.e. put tenants 86 through 100 in the last server).

Algorithm 4 is based on the following recurrence relation:

$$MP(i, j) = \begin{cases} C(1, i) & j = 1 \\ \min_k (MP(k-1, j-1) + C(k, i)), & j > 1 \end{cases}$$

---
Algorithm 3: Dynamic Programming for TP-GENERAL
---

Input : n tenants, the average query arrival rate $\lambda_i$,
processing time $r_i$ and SLA penalty $L_i$ of each tenant -continued Algorithm 3: Dynamic Programming for TP-GENERAL $t_j$, the number of servers m used by Algorithm 2
Find the value of $S_H$ using binary search
T = {$t_1$, . . ., $t_n$} = sorted tenants in the order of $L_i \times \lambda_i$
(either increasing or decreasing)
for i = 1 to n do
   M P(i, 1) = C(1, i)
end
for j = 2 to m do
   for i = j to n do
      l = arg $\min_{1 \leq k \leq i-1}$(M P(k, j − 1) + C(k + 1, i))
      PrevCut(i, j) = l
      M P(i, j) = M P(l, j − 1) + C(l + 1, i))
   end
end
Cuts(m − 1) = PrevCut(n, m)
for j = m − 2 to 1 do
   Cuts(j) = PrevCut(Cuts(j + 1), j + 1)
end
Output the optimal placement based on M P and Cuts Algorithm 4 iteratively fills up the cells in the table. In the end, we compute MP(n,m), and more importantly, we can find all cuts by following PrevCut(i,j) in the backward direction, starting from PrevCut(n,m).

Algorithm 3 and Algorithm 4 can be coupled. We first use Algorithm 3 to find the number of servers used by APP, then use Algorithm 4 to find the placement. In this way, we guarantee to output a solution that is no worse than using Algorithm 3 alone.

While a cloud service provider may have a large number of tenants that need to be placed on servers, it is often possible to have additional set of tenants arriving later. Both Algorithm 2 and Algorithm 3 can be adapted to handle incremental arrival of tenants. If we do not sort the tenant by size in Algorithm 2 and only place each tenant either on the last created server or a new server, the approximation ratio will be 4.

To handle online tenant placement using Algorithm 2, we can simply process the tenants one by one without sorting them, and the performance of the algorithm is still bounded. In the general case where different tenants have different query types and SLA penalties, we can also use Algorithm 3 to place the tenants. However, if we do not process the tenants in the order of normalized SLA penalty, there is no guarantee on the performance. Nonetheless, if the tenants arrive in batches, e.g., 10 new tenants a day, we can sort these new tenants by their SLA penalty to improve the quality.

When all tenants have the same or similar SLA, and issue the same or similar queries, Algorithm 2 has the best performance, with a time complexity of O(nm) where n is the number of tenants and m is the number of servers it uses. The placement phase of Algorithm 3 takes O(nm), or O($n^2$) time. Since it needs to sort the tenants, the total time complexity is O(n log n+nm). It should be used when the tenants have a large variance on query processing time and/or SLA penalty.

Algorithm 4 guarantees to output a placement no worse than that output by Algorithm 3, since it computes the optimal placement given a fixed order of tenants and a fixed number of servers. However, the time complexity of Algorithm 4 is O($n^2$m), since it needs to fill a table that has O(nm) cells, and it takes O(n) time to fill each cell. This complexity is essentially O($n^3$). Besides, Algorithm 3 naturally handles online placement while Algorithm 5.4 is less helpful. Thus Algorithm 5.4 should be used for the initial placement when the size of the input is relatively small or efficiency is not critical.

Multitenancy supports a large number of tenants economically by accommodating multiple tenants within a single server. This paper studies how to find a good tenant placement from the perspective of service provider's profit, which can be an integral part of a service provider's strategies. The process of tenant placement is optimized for cost minimization, which is strongly NP-hard. Two approximation algorithms can be used, one for a special case and one for the general case, with approximation ratios 3 and 4, respectively. A DP procedure can be used to couple the approximation algorithm for better performance. Evaluations have shown the excellent performance of the system.

Figure 4:
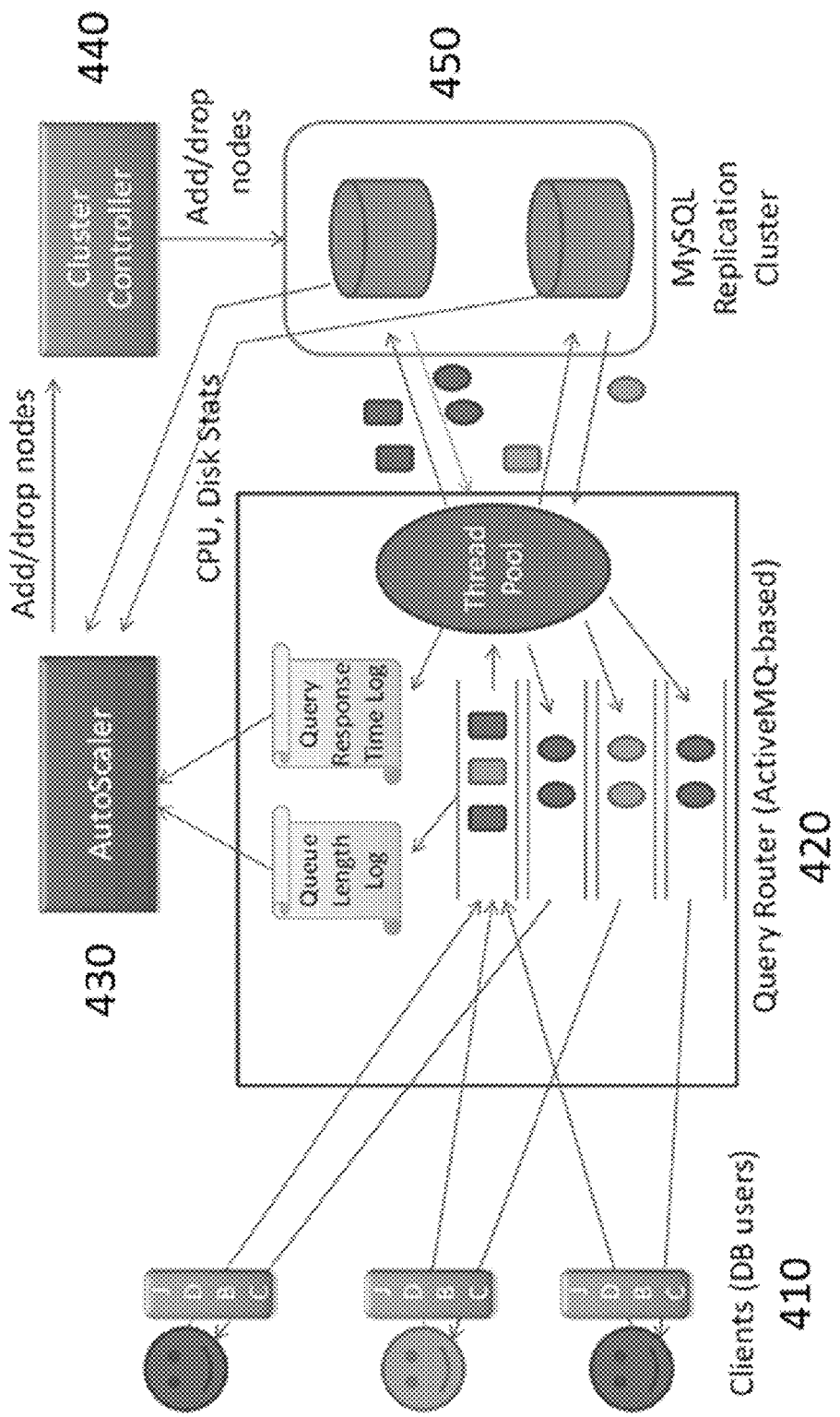
FIG. 4 shows an exemplary system to manage large cloud service delivery infrastructures.

FIG. 4 shows an exemplary system to manage large cloud service delivery infrastructures. The system architecture focuses on components that are relevant and subject to optimization to achieve the goal of SLA-based profit optimization of resource and workload management in the cloud databases. The use of distinctively optimizing individual system components with a global objective in mind provides a greater degree of freedom to customize operations. This approach yielded higher degrees of performance, customizability based on variable business requirements, and end-to-end profit optimization.

In one embodiment, clients 410 communicate with a query router 420. An autoscaler 430 monitors the queue length log and query response time log and determines if additional nodes should be added by an add/drop controller 440. The controller issues commands to add/drop nodes to a database replication cluster 450 such as a MySQL replication cluster. Although the system of FIG. 4 shows specific product names, such as MySQL and Active MQ, for example, the system is not limited to those products. For example MySQL can be replaced with other database products such as Oracle, among others.

The system has a Client Data Module that is responsible for maintaining client specific data such as cost functions and SLAs, which are derived from client contracts. Once captured, this information is made available to other system modules for resource and workload management purposes. An Manager monitors the status of system, e.g. system load, queue lengths, query response time, CPU and I/O utilization. All this information is maintained by the System Data module. Based on system monitoring data the Manager directs the Cluster Manager to add or remove servers from/to Resource Pool to optimize the operational cost while keeping the SLA costs in check. The Manager also provides the dispatcher and scheduler modules with the dynamic system data. An Online Simulator is responsible for dynamic capacity planning. It processes the client data and dynamic system data to assess optimum capacity levels through simulation. It has capabilities to run simulations both in offline and online modes. A Dispatcher takes incoming client calls and immediately forwards the queries (or jobs) to servers based on the optimized dispatching policy. The dispatching policy is constantly tuned according to dynamic changes in the system, such as user traffic, addition/removal of processing nodes. A Scheduler decides the order of execution of jobs at each server. After the client requests are dispatched to individual servers based on the dispatching policy, individual scheduler modules are responsible for prioritization of dispatched jobs locally by forming a queue of queries, from which a query is chosen and executed in the database. The choice of which query to execute first makes a difference in the SLA penalty costs observed.

The system uses an SLA-based profit optimization approach for building and managing a data management platform in the cloud. The problem of resource and workload management is done for a data management platform that is hosted on an Infrastructure-as-a-Service (IaaS) offering, e.g., Amazon EC2. The data management platform can be thought of a Platform-as-a-Service (PaaS) offering that is used by Software-as-a-Service (SaaS) applications in the cloud.

In the system model, each server node represents a replica of a database. When a query (job) arrives, a dispatcher immediately assigns the query to a server among multiple servers, according to certain dispatching policy; for each server, a resource scheduling policy decides which query to execute first, among those waiting in the associated queue; and a capacity planning component is in charge of determining how many resources (i.e., database servers) to be allocated in the system. With this abstraction, the system optimizes three tasks: query dispatching, resource scheduling, and capacity planning.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 3:
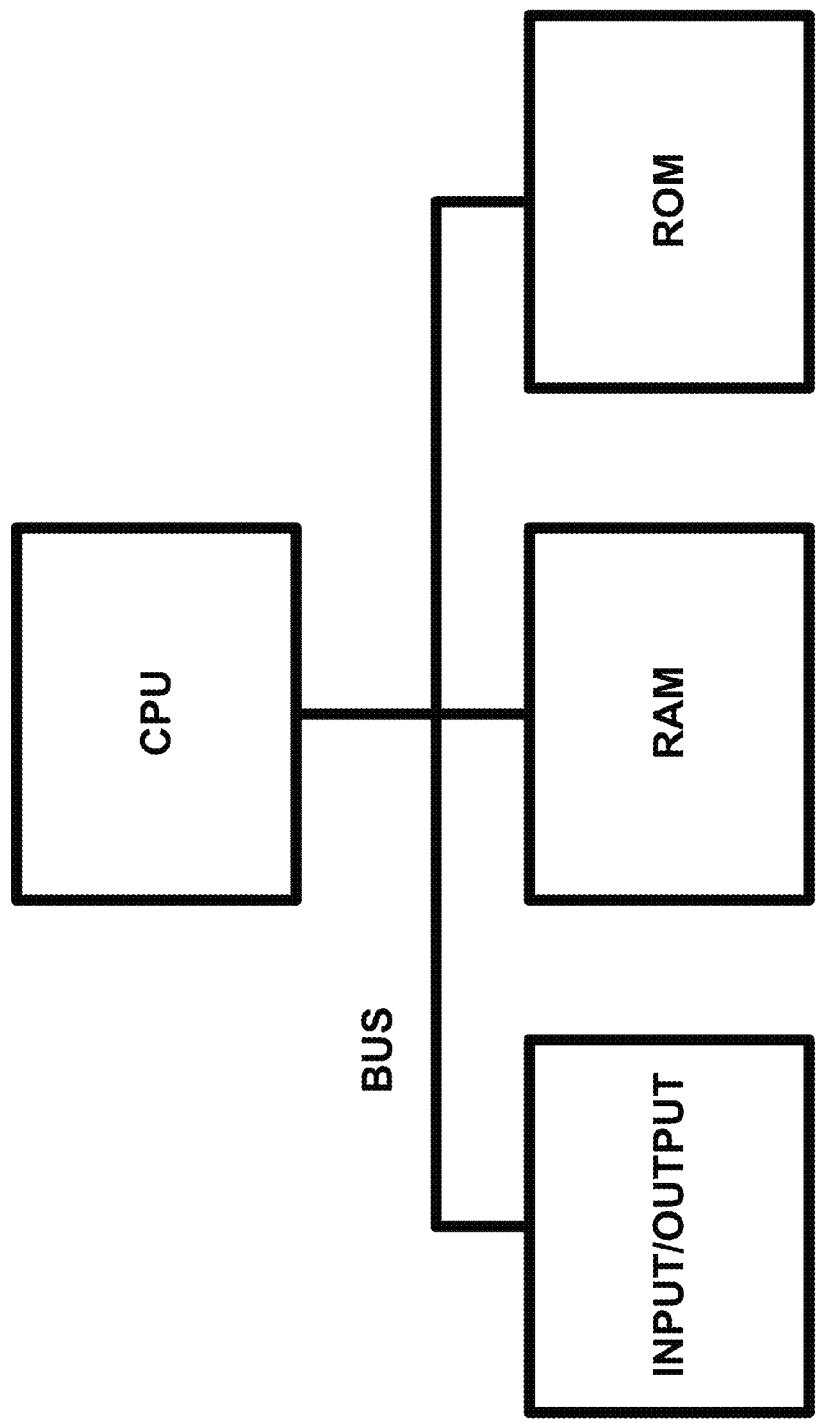
FIG. 3 shows an exemplary computer to perform aggregated load distribution with the penalty.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for database consolidation, comprising:
generating a model for expected penalty estimation;
determining a tenant's value as a function of query arrival rate and Service Legal Agreement SLA penalty;
placing a tenant to minimize a total expected cost in the order of the tenant value; and
progressively using additional servers to prevent any server from being saturated to guarantee a tenant placement that costs no more than four times the cost of any other placement.

2. The method of claim 1, comprising consolidating multiple database tenants into a single server.

3. The method of claim 1, comprising checking if placing the tenant on an existing server makes the server sequentially splittable.

4. The method of claim 1, comprising checking if placing the tenant on a new server reduces cost relative to placing the tenant on an existing server.

5. The method of claim 1, comprising placing a tenant with uniform query processing time and SLA penalty across tenants with an approximation ratio over standard placement of 3.

6. The method of claim 1, comprising placing a tenant without considering SLA penalty (general case) with an approximation ratio over standard placement of 4.

7. The method of claim 1, comprising coupling dynamic programming with an approximation placement of tenant for improved quality and low cost.

8. The method of claim 1, comprising for SLA profit-aware decisions for both tenant placement and capacity planning.

9. The method of claim 1, comprising maximizing $$\text{Profit} = \sum_i r_i - OpCost$$

where $r_i$ is the revenue generated by a query i, while OpCost is the operational cost.

10. The method of claim 9, comprising a recurrence relation:

$$MP(i, j) = \begin{cases} C(1, i) & j = 1 \\ \min_k (MP(k-1, j-1) + C(k, i)), & j > 1 \end{cases}$$

where $C(i,j)$ is an expected SLA penalty when co-locating tenants $t_i$ through $t_j$ within a single server.

* * * * *